US012128262B2

(12) United States Patent
McKay et al.

(10) Patent No.: US 12,128,262 B2
(45) Date of Patent: *Oct. 29, 2024

(54) CONNECTION APPARATUS FOR BREATHING APPARATUS

(71) Applicant: DRAEGER SAFETY UK LIMITED, Blyth (GB)

(72) Inventors: Timothy McKay, Northumberland (GB); Paul Nicholas Townsend, Northumberland (GB); Jason Edward Allan, Tyne and Wear (GB); Lee Kevin Brimer, Newcastle Upon Tyne (GB); Evan Hannard, Tyne and Wear (GB)

(73) Assignee: DRAEGER SAFETY UK LIMITED, Northumberland (GB)

( * ) Notice: Subject to any disclaimer, the term of this patent is extended or adjusted under 35 U.S.C. 154(b) by 599 days.

This patent is subject to a terminal disclaimer.

(21) Appl. No.: 17/255,245

(22) PCT Filed: Jun. 24, 2019

(86) PCT No.: PCT/GB2019/051776

§ 371 (c)(1),
(2) Date: Dec. 22, 2020

(87) PCT Pub. No.: WO2020/002894

PCT Pub. Date: Jan. 2, 2020

(65) Prior Publication Data

US 2021/0268317 A1 Sep. 2, 2021

(30) Foreign Application Priority Data

Jun. 26, 2018 (GB) ..................................... 1810482

(51) Int. Cl.
*A62B 9/02* (2006.01)
*A62B 9/04* (2006.01)

(52) U.S. Cl.
CPC ................ *A62B 9/022* (2013.01); *A62B 9/04* (2013.01)

(58) Field of Classification Search
CPC ... A62B 9/00; A62B 9/02–04; A62B 7/00–04; A62B 7/10–12; A62B 18/00; A62B 18/02–10; A61M 16/06–0891
See application file for complete search history.

(56) References Cited

U.S. PATENT DOCUMENTS 4,685,456 A * 8/1987 Smart ............... A61M 16/0672 128/207.18
5,271,390 A * 12/1993 Gray ........................ A62B 9/04 128/205.24

(Continued)

FOREIGN PATENT DOCUMENTS

DE 102012201945 A1 8/2013
EP 0553894 A2 8/1993

(Continued)

OTHER PUBLICATIONS

International Search Report, dated Oct. 9, 2019, and Written Opinion issued in the international application.

(Continued)

*Primary Examiner* — Rachel T Sippel
*Assistant Examiner* — Jacqueline M Pinderski
(74) *Attorney, Agent, or Firm* — Saul Ewing LLP

(57) ABSTRACT

There is disclosed a connection apparatus for connecting breathing gas delivery components of a breathing apparatus, comprising: a male connector configured to be received in a corresponding female port, the male connector comprising a perimeter wall defining an external shape of the male connector and enclosing a gas conduit. The perimeter wall comprises a distal portion defining a first cross-sectional area of the male connector, a proximal portion defining a second cross-sectional area of the male connector larger than (Continued)

the first cross-sectional area, and a tapered portion formed between the proximal portion and the distal portion.

17 Claims, 8 Drawing Sheets

(56) References Cited

U.S. PATENT DOCUMENTS

| | | | | |
|---|---|---|---|---|
| 5,357,950 | A | 10/1994 | Wippler et al. | |
| 10,561,864 | B2 | 2/2020 | Niewiadomski et al. | |
| 2004/0261797 | A1* | 12/2004 | White | A61M 16/0057 128/206.11 |
| 2005/0011524 | A1* | 1/2005 | Thomlinson | A61M 16/0825 128/207.18 |
| 2007/0125384 | A1* | 6/2007 | Zollinger | A61M 16/06 128/206.24 |
| 2007/0163600 | A1* | 7/2007 | Hoffman | A61M 16/0683 128/207.18 |
| 2009/0065729 | A1* | 3/2009 | Worboys | A61M 16/08 251/367 |
| 2009/0293881 | A1* | 12/2009 | Graham | A61M 16/06 128/207.12 |
| 2010/0139661 | A1 | 6/2010 | Landis | |
| 2014/0216475 | A1* | 8/2014 | Blomberg | A62B 9/04 128/863 |
| 2017/0151411 | A1* | 6/2017 | Osborne | G01K 13/02 |

FOREIGN PATENT DOCUMENTS

| | | | |
|---|---|---|---|
| GB | 1466382 | A | 3/1977 |
| GB | 1527332 | A | 10/1978 |
| WO | 2010067218 | A1 | 6/2010 |

OTHER PUBLICATIONS

GB Search Report, dated Dec. 12, 2018, issued in priority GB Application No. 1810482.8.

* cited by examiner

CONNECTION APPARATUS FOR BREATHING APPARATUS

CROSS-REFERENCE TO RELATED APPLICATIONS

This application claims the priority of PCT Application No. PCT/GB2019/051776, filed on Jun. 24, 2019, which claims the priority of GB Application No. GB1810482.8, filed on Jun. 26, 2018, the entire contents of which being fully incorporated herein by reference.

BACKGROUND OF THE INVENTION

The present disclosure concerns connection apparatus for connecting components of a breathing apparatus. In particular, the disclosure concerns connecting apparatus for connecting a lung demand valve to a breathing face mask.

Breathing apparatus for emergency services typically comprise, amongst other features, a source of breathing gas configured to be supported by the user, a face mask to be worn by the user, and a lung demand valve (LDV) for delivering breathing gas from the source to the face mask on demand.

In many cases, it is desirable for the LDV to be detachable from the face mask. Such an arrangement means that the mask can be donned during mission preparation in sufficient time before entering an emergency environment, but the LDV and, hence, the limited supply of breathing gas can be connected immediately before entering the emergency environment to maximise the operating time for the user.

In some prior systems, a port apparatus is provided for connecting the LDV to the face mask, whereby a cylindrical male port of the LDV is received in a corresponding cylindrical female port of the mask. In such systems, the male and female port elements can typically rotate with respect to one another to provide flexibility of movement for the user. However, this can result in the orientation of the LDV being unknown, particularly in low visibility environments, which may jeopardise user safety if their control features (e.g. buttons) of the LDV cannot be quickly located. Furthermore, as the mask is typically worn during connection of the LDV to the mask, it may be difficult for the user to quickly align the male and female port elements correctly.

Accordingly, it will be understood that improvements are desirable in the field of connections for breathing apparatus.

SUMMARY OF THE INVENTION

According to a first aspect, there is provided a connection apparatus for connecting breathing gas delivery components of a breathing apparatus, comprising: a male connector configured to be received in a corresponding female port, the male connector comprising a perimeter wall defining an external shape of the male connector and enclosing a gas conduit; wherein the perimeter wall comprises a distal portion defining a first cross-sectional area of the male connector, a proximal portion defining a second cross sectional area of the male connector larger than the first cross sectional area, and a tapered portion formed between the proximal portion and the distal portion. The first cross-sectional area of the male connector may be defined by the area enclosed by an external surface of the perimeter wall in the distal portion. The second cross-sectional area of the male connector may be defined by the area enclosed by an external surface of the perimeter wall in the proximal portion. The male connector may be receivable into a corresponding female port.

Breathing gas delivery components may be any components of a breathing apparatus which are operable to deliver or supply breathing gas to a user, or to transport breathing gas (including exhaled breathing gas). The breathing gas delivery components may, for example, include lung demand valves, closed circuit breathing apparatus supply ports and hoses, breathing face masks, and breathing gas transport hoses.

The male connector may define an insertion axis along which the male connector is receivable into a corresponding female port. The insertion axis may be any axis, such as a notional axis, which is parallel to an axial or longitudinal direction of the male connector or the female port. The insertion axis may define an insertion direction or vector. The insertion direction may be a direction parallel to the insertion axis. The perimeter wall may define a perimeter or external cross-sectional shape of the male connector when viewed along the insertion axis.

The corresponding female port may define a receiving axis along which the male connector is receivable into the female port. In use when the male connector is received within the corresponding female port, the insertion and receiving axes may be arranged coaxially.

The tapered portion of the perimeter wall may form a taper angle with the insertion axis. The tapered portion of the perimeter wall may be inclined with respect to the insertion axis.

The taper angle may be varied with the angular position around the insertion axis.

The distal portion may be arranged about a distal axis, and the proximal portion may be arranged about a proximal axis. The distal axis and proximal axis may be offset. The distal axis may be misaligned with the proximal axis. The distal portion may extend along the distal axis. The proximal portion may extend along the proximal axis. The distal portion may comprise a face of the male connector. The distal portion may be cylindrical. The proximal portion may comprise a face of the male connector. The proximal portion may be cylindrical.

The first cross-sectional area and/or the second cross-sectional area may be circular areas. The distal portion and/or the proximal portion may be cylindrical. One of the distal portion and the proximal portion may be cylindrical. Both of the distal portion and the proximal portion may be cylindrical. The distal portion may extend along the distal axis. The proximal portion may extend along the proximal axis. The distal axis and the proximal axis may be parallel to the insertion axis. The area enclosed by the perimeter wall at the distal portion and/or the proximal portion may be circular. The distal portion may form a distal end of the connector. The proximal portion may form a proximal end of the connector. The proximal axis may be coaxial with the insertion axis. The distal axis may be coaxial with the insertion axis. The first cross-sectional area may be smaller than the second cross-sectional area. The distal and proximal portions of the perimeter wall may extend in a direction parallel to the insertion axis of the male connector. An outer surface of the distal and proximal portions of the perimeter wall may extend in a direction parallel to the insertion axis of the male connector.

The circles which define the first cross-sectional area and the second cross-sectional area may be internally tangential.

The tapered portion may be frustoconical. The tapered portion may be obliquely frustoconical.

The connection apparatus may further comprise a corresponding female port for receiving the male connector. The female port may comprise a peripheral wall defining a cavity for receiving the male connector. The peripheral wall of the female port may comprise proximal, tapered and distal portions.

The distal portion of the male connector may be inserted into the female port before the proximal portion of the male connector. The male connector may not be rotatable with respect to the female port when received within the port.

The connection apparatus may be configured such that, when the tapered portion of the peripheral wall of the male connector is in contact with a portion of the peripheral wall of the female port, the application of force on the male connector towards the female port results in a lateral and/or rotational movement of the male connector with respect to the female port.

The male connector may be provided on a breathing gas supply component and the female port may be provided on a breathing face mask. In this case, the proximal portion of the male connector may be proximal to the breathing gas supply component, and the distal portion of the male connector may be distal to the breathing gas supply component.

The male connector may be provided on a breathing face mask and the female port may be provided on a breathing gas supply component. In this case, the proximal portion of the male connector may be proximal to the breathing face mask, and the distal portion of the male connector may be distal to the breathing face mask.

The breathing gas supply component may be a lung demand valve or a CCBA connector for supplying breathing gas from a CCBA to the breathing face mask.

According to another aspect there is provided a breathing apparatus comprising a source of breathing gas configured to be supported by a user, a breathing face mask configured to be worn by a user, breathing gas supply component configured to deliver breathing gas from the source to the breathing face mask, wherein the breathing apparatus further comprises connection apparatus for connecting the breathing gas supply component to the breathing face mask in accordance with any aspect described herein.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Embodiments will now be described by way of example only, with reference to the accompanying Figures, in which.

DETAILED DESCRIPTION OF THE INVENTION

Figure 1:
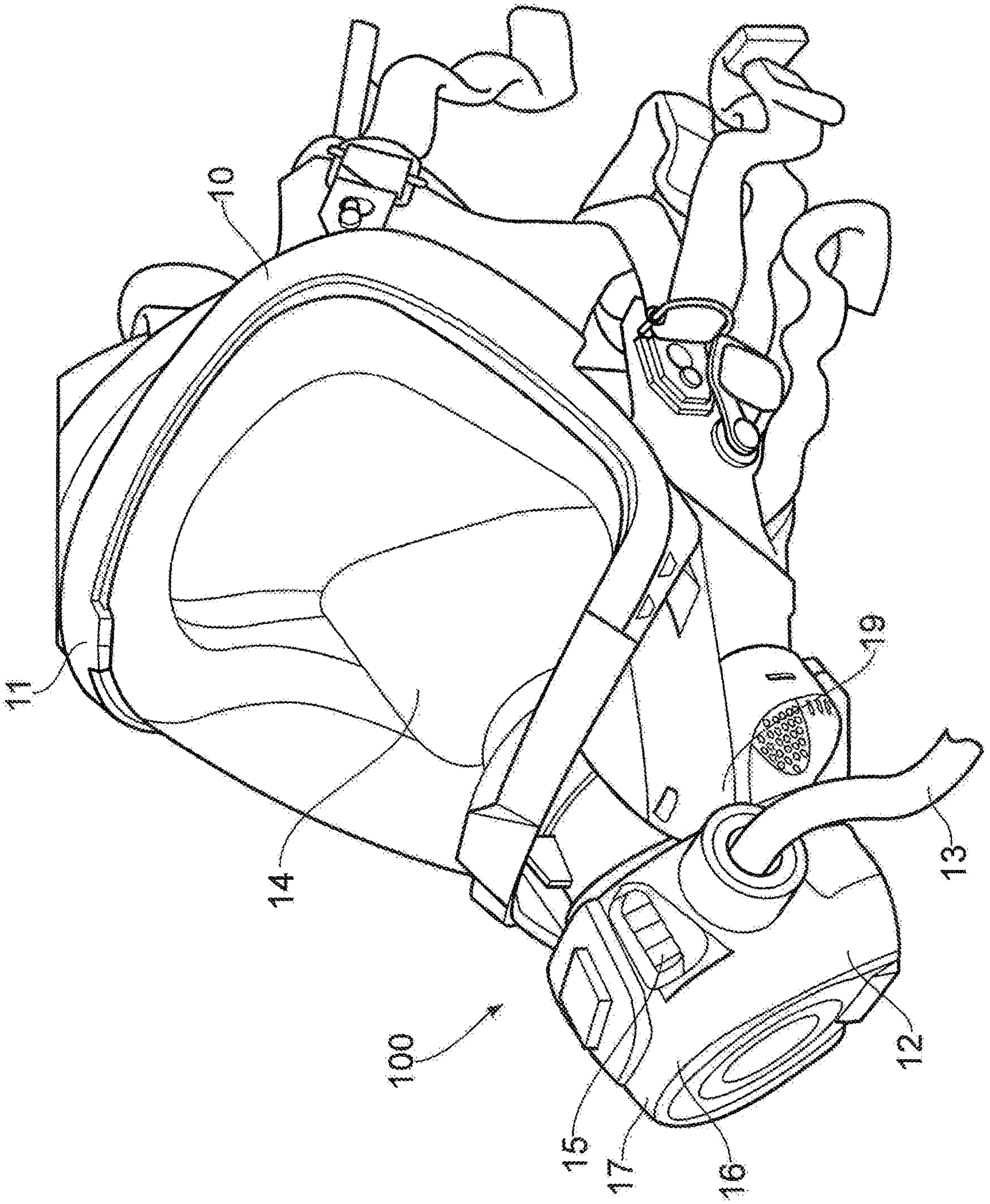
FIG. 1 shows an example of a breathing apparatus comprising a lung demand valve and a breathing face mask.

Referring first to FIG. 1, a breathing apparatus 10 is shown by way of example. The breathing apparatus 10 comprises a number of breathing gas delivery components. In this example, two particular breathing gas delivery components are shown: a breathing face mask ("mask") 11 to be worn on a user's head and a breathing gas supply component, in this example a lung demand valve (LDV) 12, connected to the mask 11 with a connection apparatus 100, which will be described in more detail below. The LDV 12 is provided with breathing air via a hose 13 which is connected to a source of breathing gas, such as a breathing gas which may be supported on the user, for example on a wearable back plate (not shown). In this example, an LDV 12 is connected to the mask 11. However, in other examples, the connection apparatus described herein may be used to connect other breathing gas delivery components. In another example, the LDV 12 may instead be a breathing gas supply port of a closed circuit breathing apparatus (or "CCBA" or "rebreather"). In these examples, the CCBA supply port or connector port is plugged directly into a breathing gas face mask, such as the exemplary mask 11, in order to provide breathing gas to the user from the CCBA circuit. Although the below detailed description relates to the connection of an LDV to a breathing face mask, it should be generally understood that the connection apparatus described herein may be used to connect any components utilised for the supply, delivery, or transport of breathing gas in any type of breathing apparatus including, but not limited to, SCBAs, CCBAs, and SCUBAs.

The mask 11 comprises an inner mask 14 which is arranged over the user's nose and mouth in use. When the user breathes in, the pressure in the mask 11 is reduced and the LDV 12 is configured to provide breathing air to the mask 11 from the breathing gas source in response to the reduced pressure in the mask 11. When the user breathes out, non-return valves in the inner mask 14 prevent exhaled air from returning into the mask 11 and the exhaled air is directed either directly out of the mask or back into the LDV 12 to 'flush' over the LDV diaphragm (if present). Where the invention is utilised with a CCBA, it will be understood that exhaled air may be directed back, via the CCBA connector port, into the CCBA circuit for re-circulation.

The LDV 12 comprises one or more control elements, such as function buttons 15, which perform various actions in relation to the LDV 12 or the breathing apparatus generally. For example, there may be a function button 15 to reset the LDV 12 before the first breath is taken or if a reset is required during use. Other function buttons 15 may release the LDV 12 from the face mask 11, or initiate a 'purge" function, which may be used to clear a vapour fogged mask, amongst other features. It will be understood that when the user is wearing the breathing apparatus 10, they may be in an environment where visibility is low, for example at the site of emergency, it may be dark or smoke may impair vision. Accordingly, it is important for the user of the breathing apparatus to know the locations of the features of their breathing apparatus without visual clues.

Turning to FIG. 2, an exemplary male connector 200 of the connection apparatus 100 is shown in more detail. In this example the male connector 200 is provided on the LDV 12, but it should be understood that in other examples, the male connector may be provided on a face mask 11. FIG. 2*a* shows a perspective view of the LDV 12 comprising the male connector (or "connector") 200. FIG. 2*b* shows a side view of the LDV 12 and the connector 200 and FIG. 2*c* shows a partial sectional side view of the LDV 12 with the connector 200 shown in cross-section in a vertical plane bisecting the connector 200 (i.e. plane C shown in FIG. 2*d*). FIG. 2*d* shows a cross-sectional view of the connector 200 along the plane A shown in FIG. 2*b*. As shown in FIG. 2*d*, the connector 200 comprises a perimeter wall 202 which defines an external surface or perimeter of the connector 200. As shown best in FIGS. 2*a* and 2*b*, the perimeter wall 202 extends from a proximal edge 204 at the LDV 12 to a distal edge 206.

Referring to FIGS. 1 and 2, the LDV 12 comprises a housing 16 which comprises an outer-facing part 17 which is exposed externally when the LDV 12 is attached to the mask 11. The housing 16 of the LDV 12 also comprises a mask-engaging part 18 which is configured to abut a housing 19 of the mask 11 in use. The male connector 200 is generally configured to protrude from the LDV 12 on the mask-engaging part 18 such that the connector 200 is received in the mask 11 when the mask-engaging part 18 abuts the mask 11 in use, as will be described below with respect to FIGS. 4-6.

The male connector 200 defines an insertion axis I along which the connector 200 is configured to be inserted into a corresponding female port, as described below.

Although the connector 200 is open across its distal end, it will be understood that the distal edge 206 of the perimeter wall 202 generally defines a distal face of the perimeter wall 202. The distal face of the perimeter wall 202 should be understood as a notional face or surface which would extend across the connector 200 between all points on the distal edge 206 of the perimeter wall 202 (e.g. in the manner of a drum skin). The distal face may be defined by a highlight surface of the connector 200 and/or the perimeter wall. In this example, the distal face of the perimeter wall 202 is also the distal face of the connector 200 but, in other examples, one or more parts of the connector 200 may extend beyond the distal edge 206 of the perimeter wall 202.

Figure 2A:
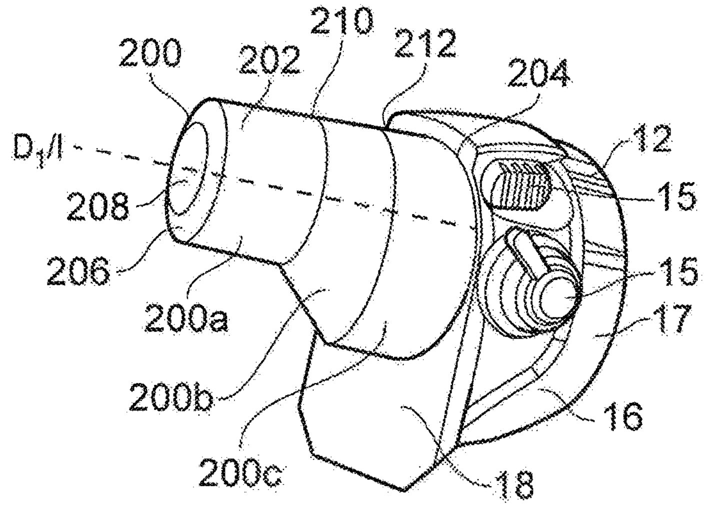
FIG. 2 shows an example of a lung demand valve comprising a male connector for a connection apparatus for connecting the lung demand valve to a breathing face mask.
Figure 2B:
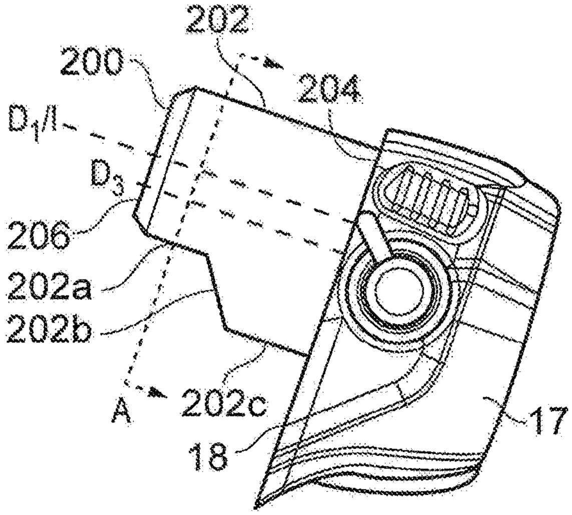
Figure 2C:
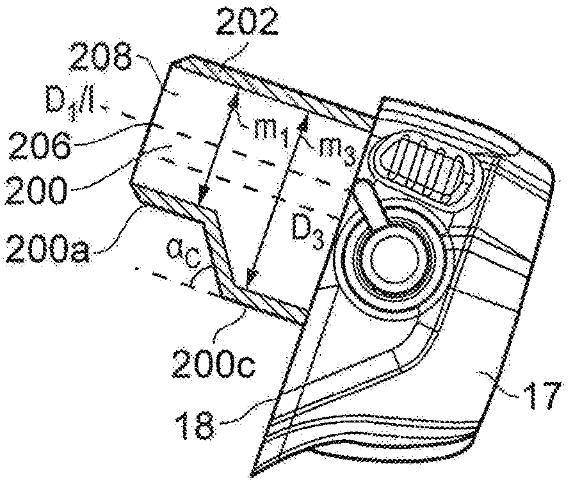

As shown in FIGS. 2*a* and 2*b*, the connector 200 comprises a distal portion 200*a*, defined by a distal portion 202*a* of the perimeter wall 202; a tapered portion 200*b* defined by a tapered portion 202*b* of the perimeter wall 202; and a proximal portion 200*c*, defined by a proximal portion 202*c* of the perimeter wall 202. As will be described, the perimeter wall 202 varies in diameter from the proximal edge 204 to the distal edge 206. The distal portion 202*a* of the perimeter wall has a constant diameter $m_1$, and terminates at the distal edge 206, which lies in a plane which is perpendicular to the insertion axis I of the connector and, in this example, to the direction of extension of the perimeter wall 202. The tapered portion 202*b* of the perimeter wall 202 has a gradually increasing diameter along the insertion axis I in the direction from the distal edge 206 to the proximal edge 204. The proximal portion 202*c* of the perimeter wall has a constant diameter $m_3$ and terminates at the proximal edge 204 of the connector. The diameter $m_3$ of the proximal portion 202*c* of the perimeter wall is larger than the diameter $m_1$ of the distal portion 202*a* of the perimeter wall, and accordingly, the connector 200 is narrower at its distal edge 206 than its proximal edge 204.

Figure 2D:
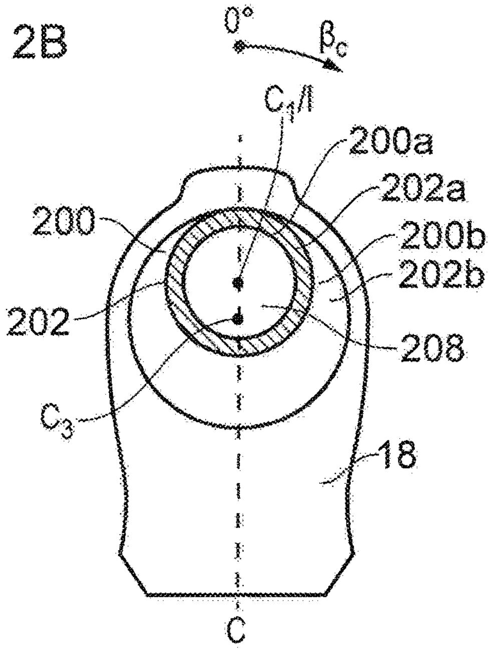

As shown in FIG. 2*d*, the perimeter wall 202 completely encircles the connector 200 and contains a first conduit 208 formed through the connector 200 for the transport of gas to and/or from the mask 11. In some other examples more than one conduit may be provided. In other examples, there may be one or more gaps or openings in the perimeter wall 202 such that it does not completely encircle the connector 200.

The cross-sectional shape of the connector 200, which is defined by the shape of the perimeter wall 202 will be discussed in more detail. The distal portion 200*a* of the connector 200 is substantially prismatic when viewed along the insertion axis as shown in FIGS. 2*a* and 2*d*. The cross-sectional shape of the distal portion 200*a* is generally circular and has a centre point C1 which defines the distal portion axis D1 along which the distal portion 200*a* extends.

The proximal portion 200*c* of the connector 200 is substantially prismatic when viewed along the insertion axis as shown in FIG. 2*a*. The cross-sectional shape of the proximal portion 200*c* is generally circular and has a centre point $C_3$ which defines the proximal portion axis $D_3$ along which the proximal portion 200*c* extends. The proximal portion axis $D_3$ is parallel to, but offset with or misaligned from, the distal portion axis $D_1$.

The tapered portion 200*b* of the connector 200 is located between the distal portion 200*a* and the proximal portion 200*c* of the connector 200 and may also be referred to as a "middle portion" of the connector 200. The tapered portion 200*b* is contiguous with the distal portion 200*a* of the connector 200 at a distal face 210 of the tapered portion 200*b*. The tapered portion 200*b* is contiguous with the proximal portion 200*c* of the connector 200 at a proximal face 212 of the tapered portion 200*b*. The distal face 210 and the proximal face 212 of the tapered portion 200*b* are substantially circular, with centre points aligned with the distal portion axis $D_1$ and the proximal portion axis $D_3$ respectively. In this embodiment, the distal face 210 and the proximal face 212 of the tapered portion 200*b* are substantially internally tangential to one another, however other arrangements would be appreciated by the skilled person where the axes are non-coaxially parallel and the distal and proximal faces are non-tangential.

The proximal face diameter $m_3$ is larger than the distal face diameter $m_1$. The diameter of the tapered portion 200*b* of the connector gradually decreases from the proximal face 212 to the distal face 210, forming a tapered region in which the tapered portion 200*b* of the connector 200 is substantially frustoconical. In the tapered portion 200*b*, the tapered portion 202*b* of the perimeter wall 202 forms an external surface which is at a taper angle $\alpha_c$ to the insertion axis I.

In this embodiment, as the proximal portion axis $D_3$ is parallel to, but offset with respect to the distal portion axis $D_1$, the tapered portion 200*b* is substantially obliquely frustoconical. The taper angle $\alpha_{c,\beta}$ of the tapered portion 200*b* to the insertion axis I varies with the angular position $\beta_c$ around the insertion axis I, such that at the top position $\beta_c$=0° (as shown in FIG. 2*d*, with the insertion axis I directed into the page at the centre point $C_1$ of the distal portion 200*a*), the angle $\alpha_{c,0}$ is a minimum (0° in this embodiment), and at a bottom position $\beta_c$=180° the angle $\alpha_{c,180}$ is a maximum. It should be understood that the angle $\alpha_{c,\beta}$ gradually increases from $\beta_c$=0°-180° and then gradually increases from $\beta_c$=180°-360°/0°. This will be apparent as the lateral spacing between the perimeter wall in the proximal and distal portions increases gradually increases from $\beta_c$=0°-180° and then gradually increases from $\beta_c$=180°-360°/0°, while the axial spacing remains constant. In other embodiments, the minimum and maximum angles may be at different angular positions which are not necessarily 180° apart.

In other embodiments, the distal portion axis $D_1$ and the proximal portion axis $D_3$ may be coaxial and the tapered portion 200*b* may be substantially right frustoconical.

Figure 3A:
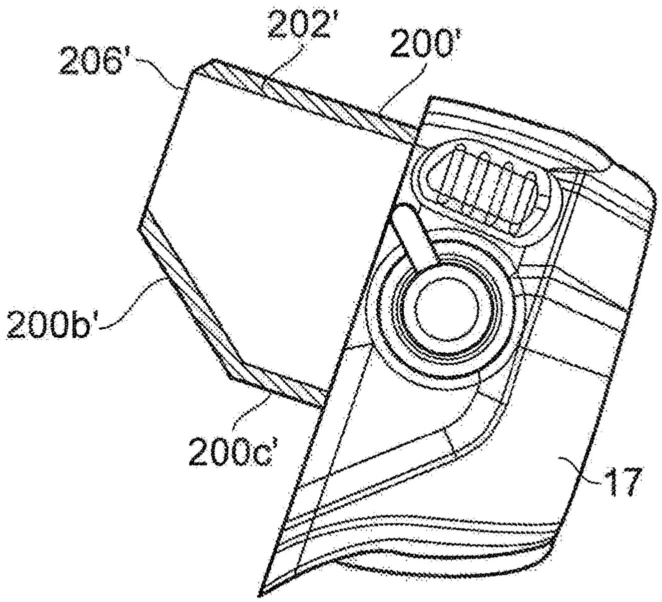
FIG. 3 shows alternative examples of the male connector of FIG. 2.
Figure 3B:
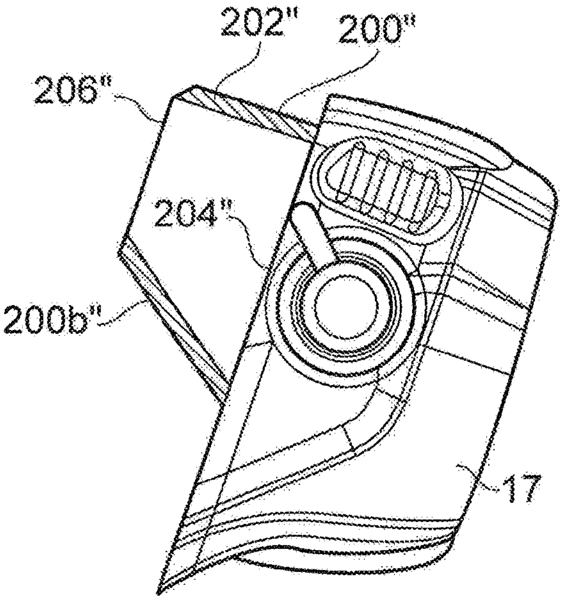
Figure 3C:
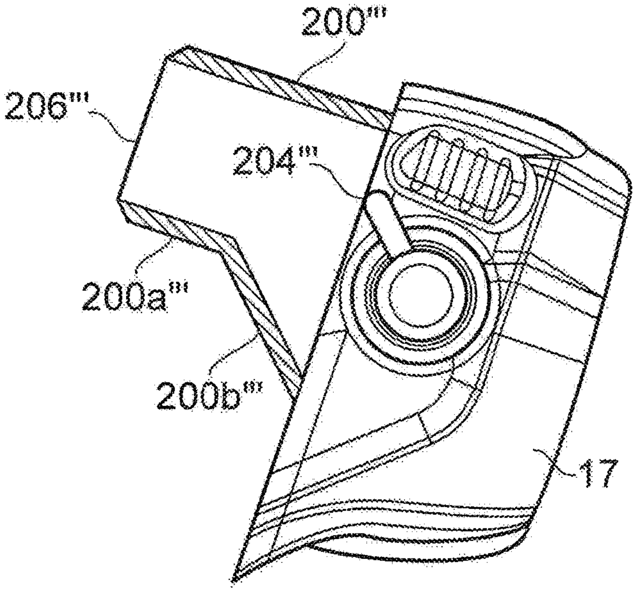

It should be understood that, in other embodiments, the male connector 200 may be realised without the distal portion 200*a* of the connector 200, the proximal portion 200*c* of the connector 200, or both, as shown in FIG. 3. Like features between FIG. 2*c* and FIGS. 3*a-c* are indicated by reference numerals differing by ' marks.

FIG. 3*a* illustrates an alternative example of a male connector 200' having a tapered portion 200*b'* and a cylindrical portion 200*c'*. The distal face of the tapered portion 200*b'* forms the distal edge 206' of the connector 200', which is equivalent to a distal portion of the connector 200'. FIG. 3*b* shows a further alternative example of a male connector 200" having a tapered portion 200*b"*. The distal face of the tapered portion 200*b"* forms the distal edge 206" of the connector 200", which is equivalent to a distal portion of the connector 200', and the proximal face of the tapered portion 200*b"* forms the proximal edge 204" of the connector 200", which is equivalent to a proximal portion of the connector 200'. FIG. 3*c* shows a yet further alternative example of a male connector 200'" having a cylindrical portion 200*a'"* and a tapered portion 200*b"*. The proximal face of the tapered portion 200*b'"* forms the proximal edge 204" of the connector 200", which is equivalent to a proximal portion of the connector 200'.

Figure 4B:
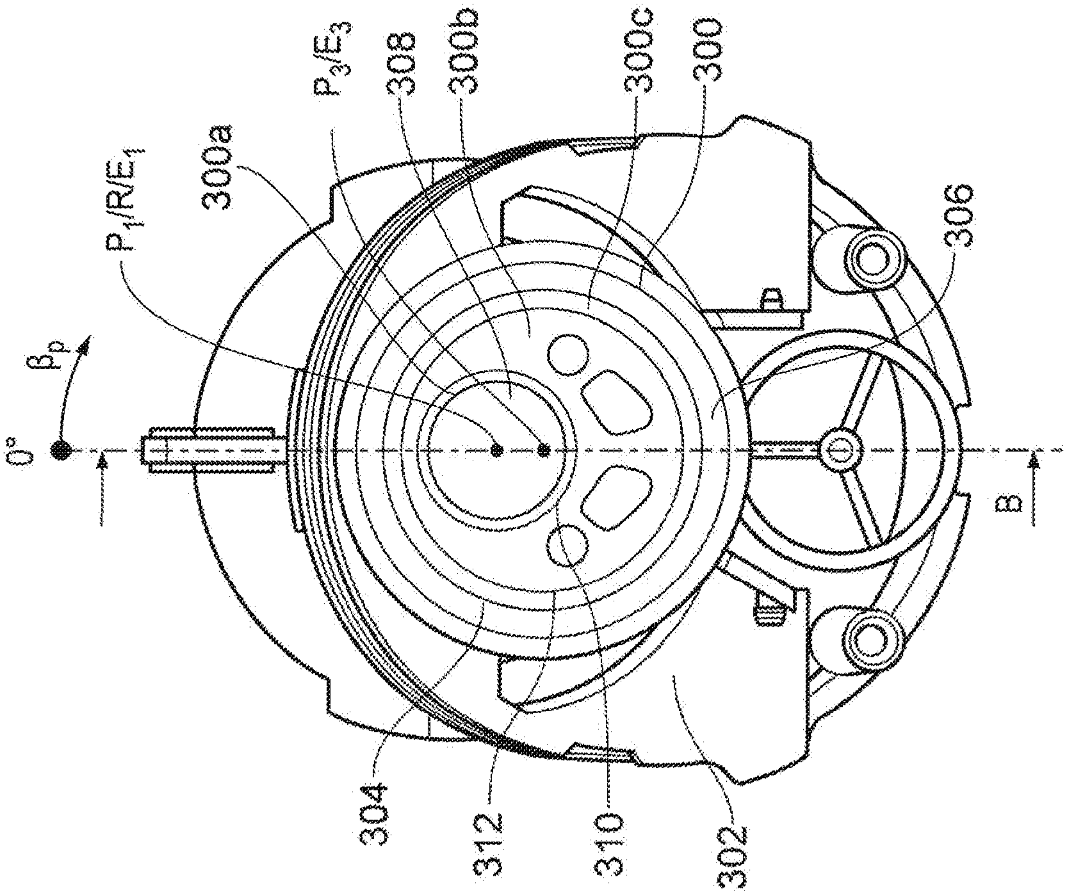
FIG. 4 shows an example of a female port apparatus for receiving a male connector.
Figure 4A:
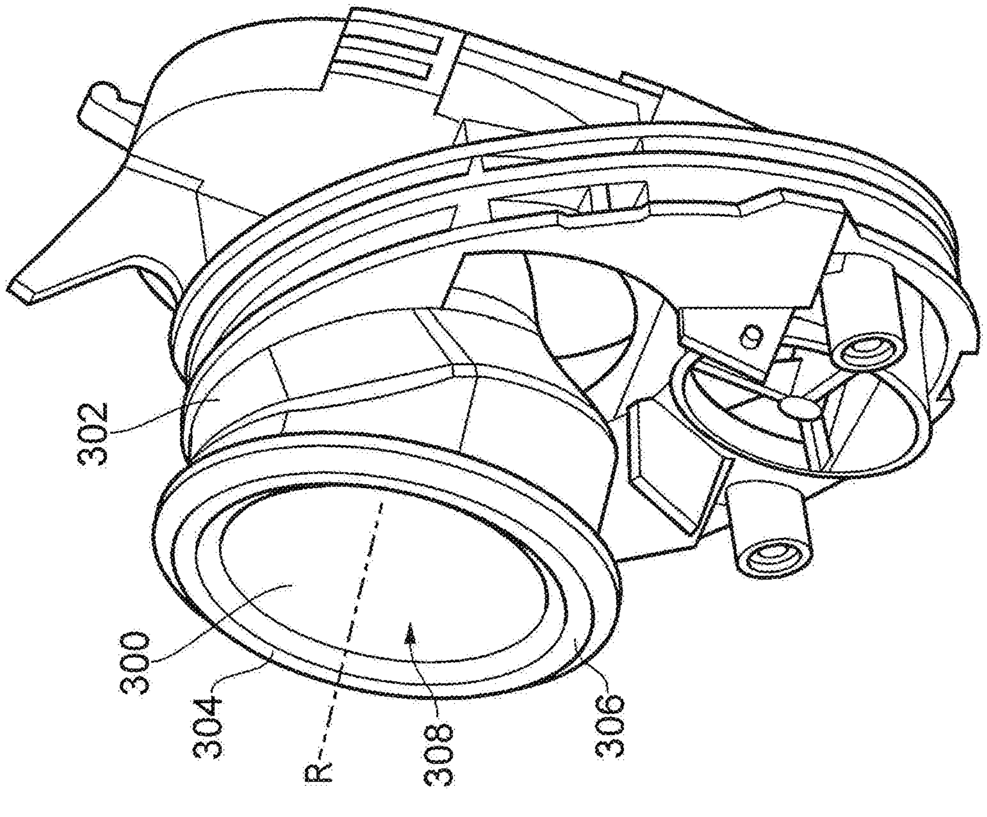

Referring now to FIG. 4, a corresponding female port 300 for receiving a male connector is shown. FIG. 4*a* shows the port 300 in perspective view and FIG. 4*b* shows the port 300 in a front view. In this example, the port 300 corresponds to the male connector 200 shown in FIG. 2*a* and discussed above. It will be understood that, generally, the male connector and the corresponding female port are complimentarily shaped and therefore the female ports corresponding to other male connectors than the exemplary male connector 200 will have different shapes complimentary for those other male connectors.

Figure 5:
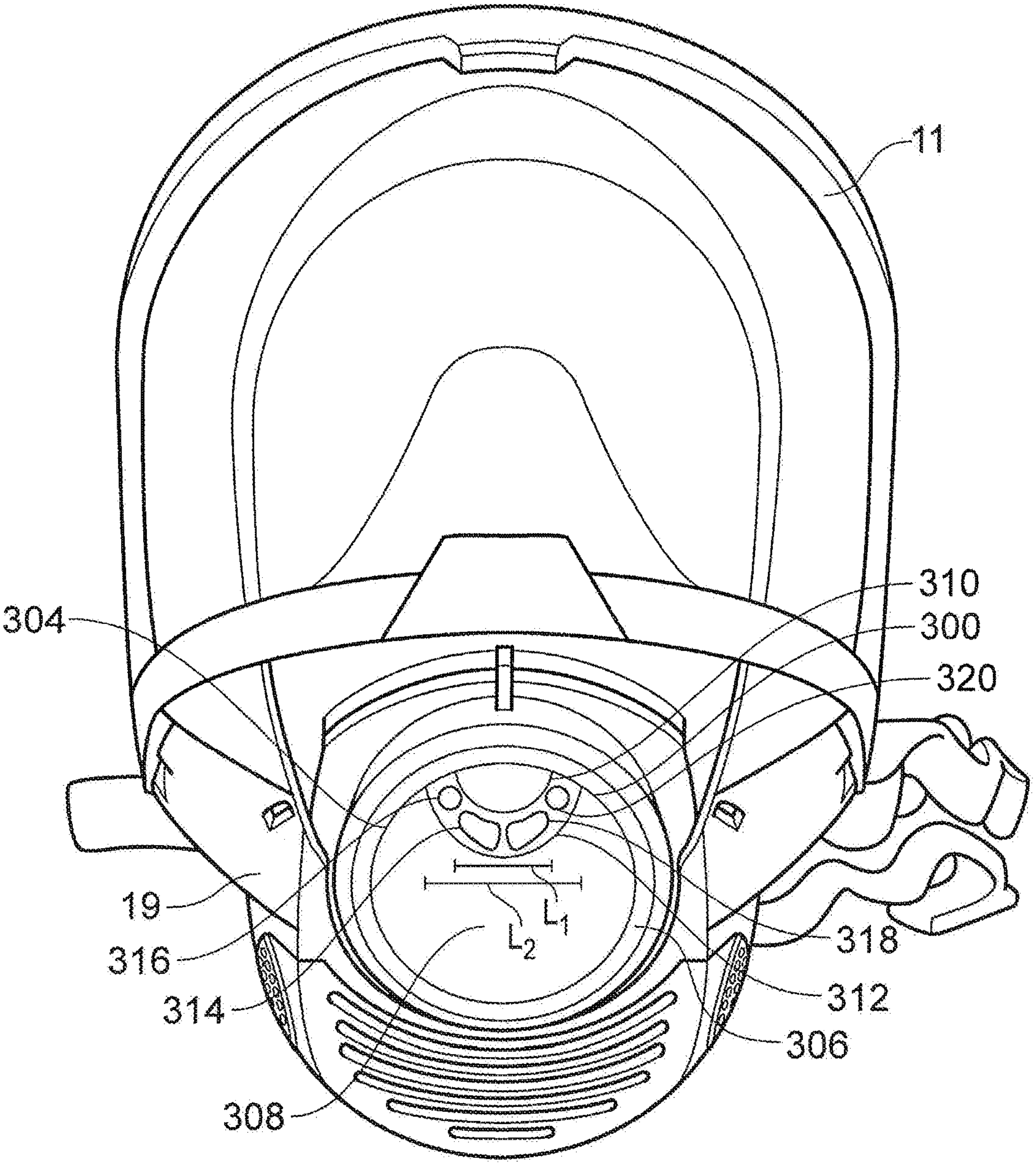
FIG. 5 shows an example of a breathing face mask comprising the female port of FIG. 4.

The port 300 is shown provided on the face mask 11 in FIG. 5. The port 300 is formed in a port housing 302 which, in use, is predominantly received beneath the housing 19 of the face mask 11. The port housing 302 comprises an LDV-engaging portion 304 which is externally exposed from the housing 19 of the face mask 11. The LDV-engaging portion 304 provides a substantially planar circular face against which the mask-engaging part 18 of the LDV 12 abuts when the LDV 12 and the mask 11 are connected in use. The LDV-engaging portion 304 of the port housing 302 encircles the port 300 itself.

The port 300 is formed by a peripheral wall 306 which extends generally into the port housing 302 to form a cavity 308 into which the male connector 200 can be received. The peripheral wall 306 is shaped complimentarily to the perimeter wall 202 of the male connector 200. The port 300 defines a receiving axis R along which the male connector 200 is received in the port 300. In particular, when the male connector 200 is received into the port 300 such that the LDV-engaging portion 304 and the mask-engaging part 18 abut, the receiving axis R and the insertion axis I are coaxial.

As the peripheral wall 306 of the port 300 is formed to compliment the shape of the peripheral wall of the male connector 200, it will be understood that the internal surface of the peripheral wall 306 is shaped substantially similar to the external surface of the perimeter wall 202 so as to provide a sliding fit when the connector 200 is guided into the port 300 with the receiving and insertion axes R, I arranged coaxially. In this embodiment, the external (or outer) surface 309 of the peripheral wall 306 is substantially cylindrical (as shown more clearly in FIG. 6), however it will be appreciated that in other embodiments, the external surface of the peripheral wall 306 may be substantially the same shape as the internal surface, or may be any other shape envisaged by the skilled person. In this embodiment, the peripheral wall 306 comprises holes 314, 316, 318, 320 which can be used to connect the face mask 11 to other gas sources or as a port for removing exhaled air from the face mask 11.

Referring to FIGS. 4 and 5, the port 300 comprises a distal portion 300*a*, a tapered portion 300*b* and a proximal portion 300*c*, each configured with an internal surface of the peripheral wall 306 to engage the corresponding portions of the connector 200. Although the distal portion 300*a* can be considered to be proximal to the port housing 302 of the port 300, it is named the distal portion in this embodiment as it is configured to receive the distal portion 200*a* of the connector 200. Similarly, although the proximal portion 300*c* can be considered to be distal to the port housing 302 of the port 300, it is named the proximal portion in this embodiment as it is configured to receive the proximal portion 200*c* of the connector 200.

The internal surfaces of the distal and proximal portions 300*a*, 300*c* are substantially prismatic when viewed along the receiving axis R. The cross-sectional shapes of the distal and proximal portions 300*a*, 300*c* are generally circular, with centre points $P_1$ and $P_3$ respectively. The distal portion 300*a* has a central distal portion receiving axis $E_1$ through centre point $P_1$ ($E_1$ extending into the page in FIG. 4*b*), along which the distal portion 300*a* extends. The proximal portion 300*c* has a central proximal portion receiving axis $E_3$ through centre point $P_3$ ($E_3$ extending into the page in FIG. 4*b*) along which the proximal portion 300*c* extends. In this embodiment, the proximal portion receiving axis $E_3$ is parallel to, but offset with or misaligned from the distal portion receiving axis $E_1$. It will be appreciated that in other embodiments the distal and proximal portion receiving axes $E_1$, $E_3$ may be coaxial.

The tapered portion 300*b* of the port 300 is located between the distal portion 300*a* and the proximal portion 300*c*. The tapered portion 300*b* is contiguous with the distal portion 300*a* at a distal end plane 310 of the tapered portion 300*b*. The tapered portion 300*b* is contiguous with the proximal portion 300*c* at a proximal end plane 312 of the tapered portion 300*b*. The distal end plane 310 and the proximal end plane 312 of the tapered portion 300*b* are substantially circular, with centre points $P_1$, $P_3$ aligned with the distal portion receiving axis $E_1$ and the proximal portion receiving axis $E_3$ respectively. In this embodiment, the distal end plane 310 and the proximal end plane 312 of the tapered portion 300*b* are substantially internally tangential to one another, however other arrangements would be appreciated by the skilled person.

The distal end plane 310 has a diameter $I_1$ and the proximal end plane 312 has a diameter $I_2$. The proximal end plane diameter $I_2$ is larger than the distal end plane diameter $I_1$. The diameter d of the internal surface of the tapered portion 300*b* of the port gradually decreases from the proximal end plane 312 to the distal end plane 310, forming a tapered region in which the internal surface of the tapered portion 300*b* of the port 300 is substantially frustoconical. In the tapered portion 300*b*, the internal surface is at a taper angle $\alpha_{p,\beta}$ to the receiving axis R.

In this embodiment, as the proximal portion receiving axis $E_3$ is parallel to, but offset with respect to the distal portion receiving axis $E_1$, the tapered portion 300*b* is substantially obliquely frustoconical. The taper angle $\alpha_{p,\beta}$ (shown in FIG. 8) of the tapered portion 300*b* to the receiving axis R varies with the angular position $\beta_p$ around the receiving axis R, such that at a top position $\beta_p=0°$ (as shown in FIG. 4*b*), the angle $\alpha_{p,0}$ is a minimum (0° in this embodiment), and at a bottom position $\beta_p=180°$ the angle $\alpha_{p,180}$ is a maximum. In other embodiments, the minimum and maximum angles may be at different angular positions which are not necessarily 180° apart. As the port 300 receives the connector 200, the receiving axis R and the insertion axis I will align to be coaxial. As the port 300 is configured to receive the connector 200, it will be understood that the taper angle $\alpha_{p,\beta}$ of the port at a given angle $\beta_p$ to the receiving axis R will be equivalent to the taper angle $\alpha_c$ of the connector at the same angle $\beta_c=\beta_p$ to the insertion axis I.

In other embodiments, the distal portion receiving axis $E_1$ and the proximal portion receiving axis $E_3$ may be coaxial and the tapered portion 300*b* may be substantially right frustoconical.

The male connector 200 or the port 300 may have one or more locking features (not shown) which enable the male connector 200 to be releasably locked in place in the port 300 in use to avoid inadvertent disconnection of the two parts of the connection apparatus 100.

It should be understood that the description of the shape of the port 300 in FIG. 4 is specific to the corresponding port for the male connector 200 of FIG. 2*a*. Similarly, it should be understood that for other shapes of male connector, the corresponding female port will have a peripheral wall which is shaped so as to compliment and receive the male connector in a slidable manner within it in use. For example, the male connector 200' of FIG. 3*a* would have a corresponding female port comprising portions shaped to receive the tapered portion 200*b*' and the cylindrical portion 200*c*' of the connector 200', and the male connector 200" of FIG. 3*b* would have a corresponding female port comprising a portion shaped to receive the tapered portion 200*b"*.

Figure 6:
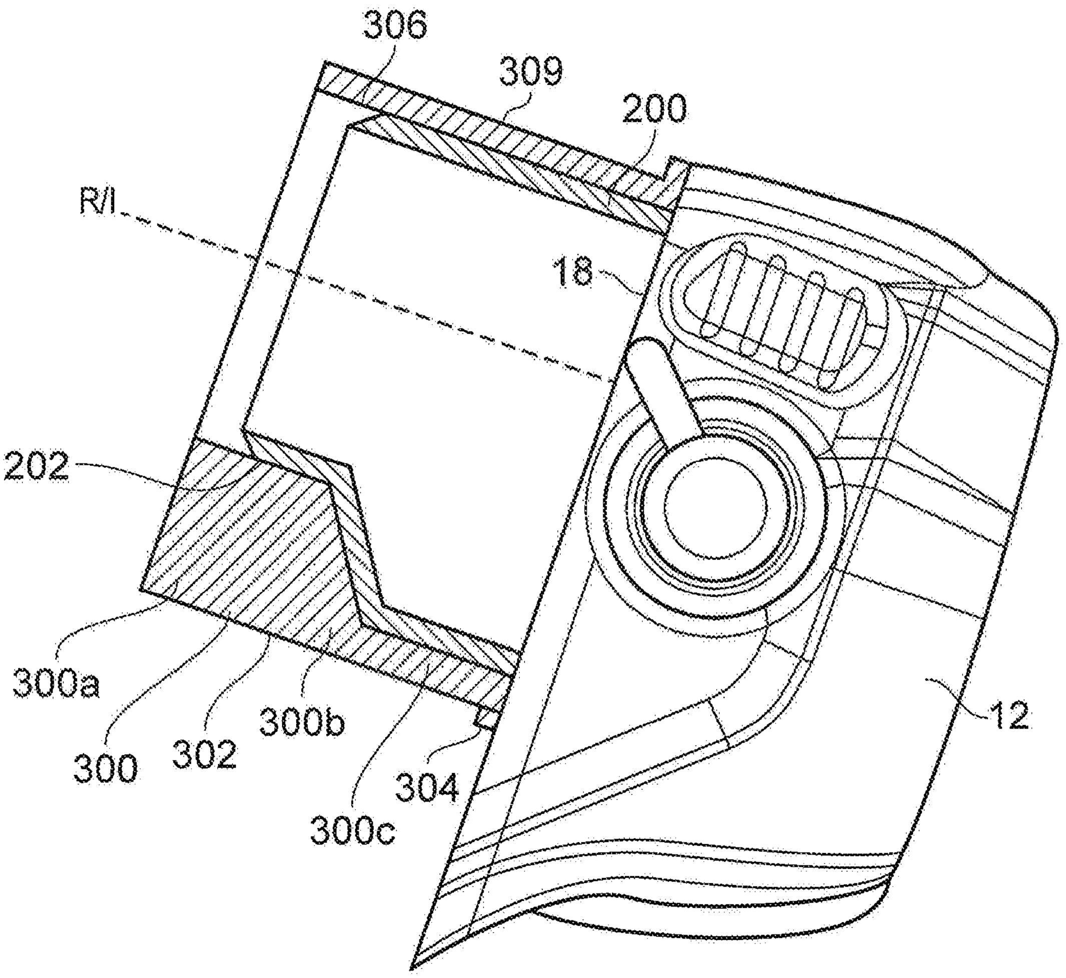
FIG. 6 shows a partial sectional side view of an example of a connection apparatus comprising a male connector and a female port when connected.

Referring to FIG. 6, the connection of the male connector 200 and the port 300 will be described in more detail. This figure shows the LDV 12, with the male connector 200 shown in cross-section and shows the port 300 in cross section on plane B shown in FIG. 4*b*. For ease of understanding, FIG. 6 shows the port 300 without the surrounding port housing 302 and mask 11.

In FIG. 6, the male connector 200 is fully received within the port 300. As shown, the insertion axis I and the receiving axis R are substantially coaxial. The external surface of the perimeter wall 202 of the male connector 200 slidably engages the internal surface of the peripheral wall 306 of the port 300 about the entire perimeter of the male connector 200. The LDV-engaging portion 304 of the port housing 302 abuts the mask-engaging part 18 of the LDV 12. It will be understood that, absent any locking mechanism (or with any provided locking mechanism unlocked), the male connector 200 is slidable into and out of the female port along the aligned insertion/receiving axes I/R. Accordingly, in order to connect the LDV 12 to the mask 11, the LDV 12 can be brought into a position in which the connector 200 and the port 300 are axially and rotationally aligned (i.e. with the insertion/receiving axes I/R arranged coaxially) and moved axially towards the port 300 to thereby slide the male connector 200 into the port 300. Conversely, to disconnect the LDV 12 and the mask 11, the LDV 12 can be moved axially away from the port 300 such that the male connector 200 slides axially out of the port 300.

The connection apparatus described herein may enable an LDV and a facemask to be connected in a single fixed rotational orientation. Accordingly, any control features, such as the function buttons 15, which are provided on the LDV may be in a known orientation with respect to the mask 11 and the user, and therefore it will be possible for the user to memorise and intuitively know the position of the control features in low visibility.

It should be understood however that the requirement for a specific alignment of the male connector and female port may make it more difficult for the user to insert the connector into the port. In particular, the LDV is often attached to the face mask after the mask is donned, so the user cannot see the exact location and relative orientation of the connector and the port.

The connection apparatus described herein also serve to alleviate these additional problems as will be described with respect to FIGS. 7 and 8.

Figure 7A:
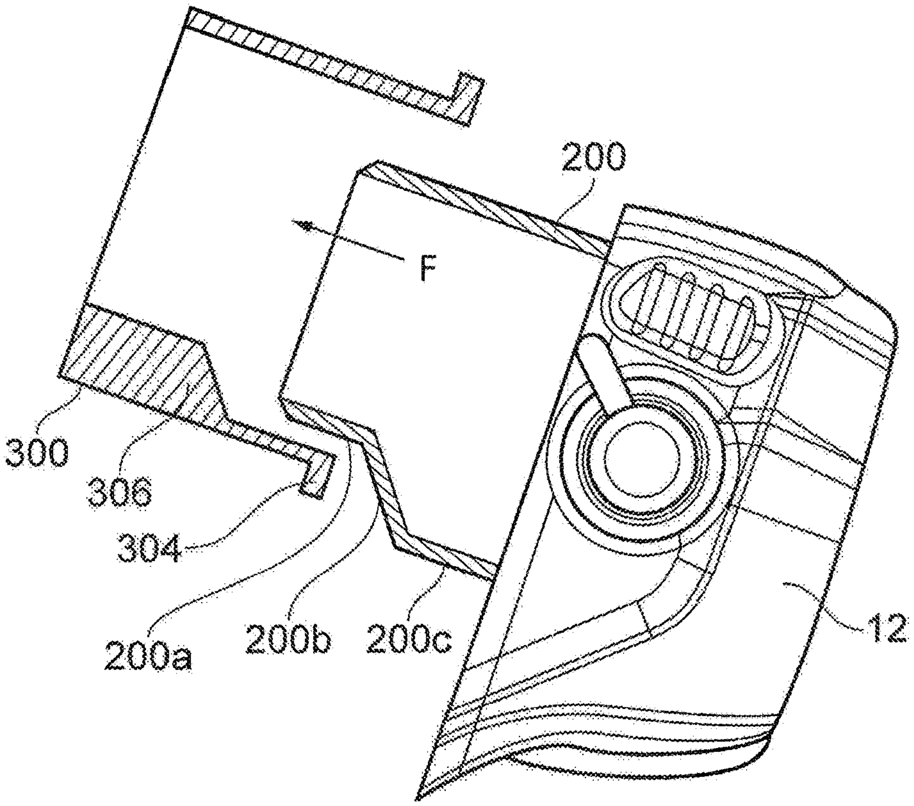
FIG. 7 shows a partial sectional side view of the interaction between a male connector and a female port when vertically misaligned during a connecting operation.
Figure 7B:
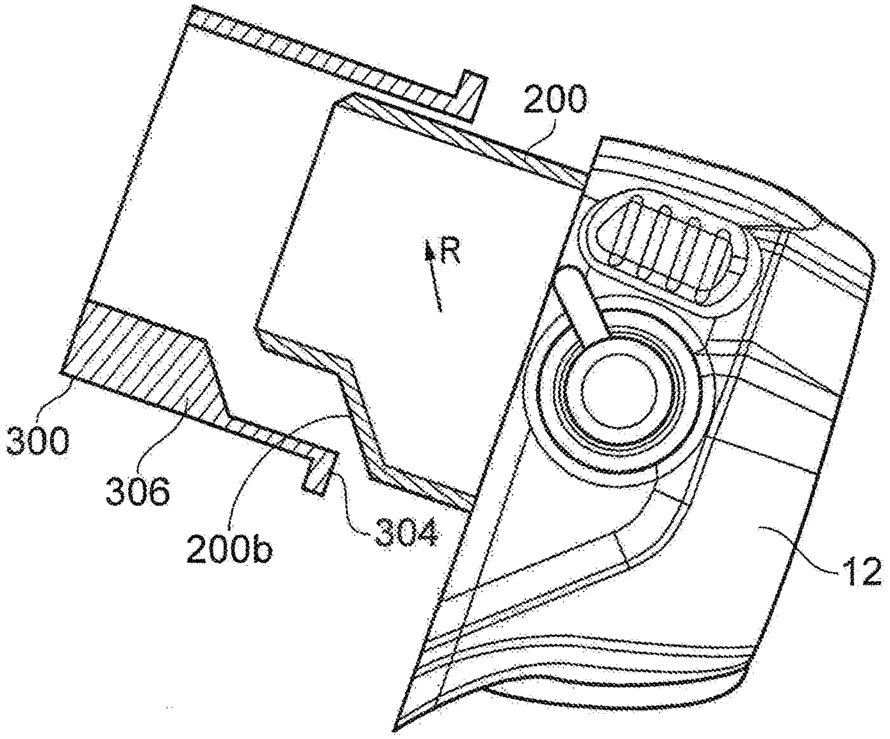

First, in FIGS. 7*a* and 7*b*, a transverse misalignment of the male connector and the female port will be discussed. A transverse misalignment is generally a translational misalignment of the connector and the female port in a plane perpendicular to the insertion/receiving axes. FIG. 7*a* illustrates the scenario in which the male connector, in this case an exemplary connector 200, is vertically misaligned with the port 300 when connection is attempted. As is evident from FIG. 7*a*, the male connector 200 is too low to be slidingly received within the port 300 in a direction directly parallel the receiving axis R.

If the LDV 12, with the male connector 200 is moved towards the port 300 in the direction shown in arrow F, then the first part of the connector 200 to contact a part of the port 300 will be the tapered portion 200*b*, which as discussed above, is inclined with respect to the direction of the insertion axis I. Once a force is applied to the LDV in the direction F, the contact between the tapered portion 200*b* and the edge between the peripheral wall 306 and the LDV-engaging portion 304 will result in movement of the LDV 12 and the male connector 200 in a resultant direction R, shown in FIG. 7*b*, as the tapered portion 200*b* of the connector 200 slides in a direction shown by arrow R parallel to the tapered portion 200*b*. As should be understood, once the male connector 200 has moved in direction R by a sufficient distance that the lower part of the male connector 200 moves within the boundary of the peripheral wall 306, then the continued application of force on the LDV in direction F will slide the male connector into the port 300 in a direction parallel to the insertion/receiving axes R/I which will now be coaxially aligned, substantially as shown in FIG. 6.

Accordingly, it will be understood that by providing a tapered or inclined portion such as the tapered portion of the male connector, a transverse misalignment of the male connector and the female port may be automatically correctable during a connection operation by virtue of the geometry of the connection apparatus.

Turning now to FIG. 8, the operation of the connection apparatus in the event of a rotational misalignment between the male connector and the female port will be discussed. In this example, the installation operation will be discussed with respect to an exemplary male connector 200 and port 300 as discussed above. For simplicity, only the cross-sectional shape of the male connector 200 along plane A in FIG. 2*b*, and the peripheral wall 306 of the port 300 is shown.

Figure 8A:
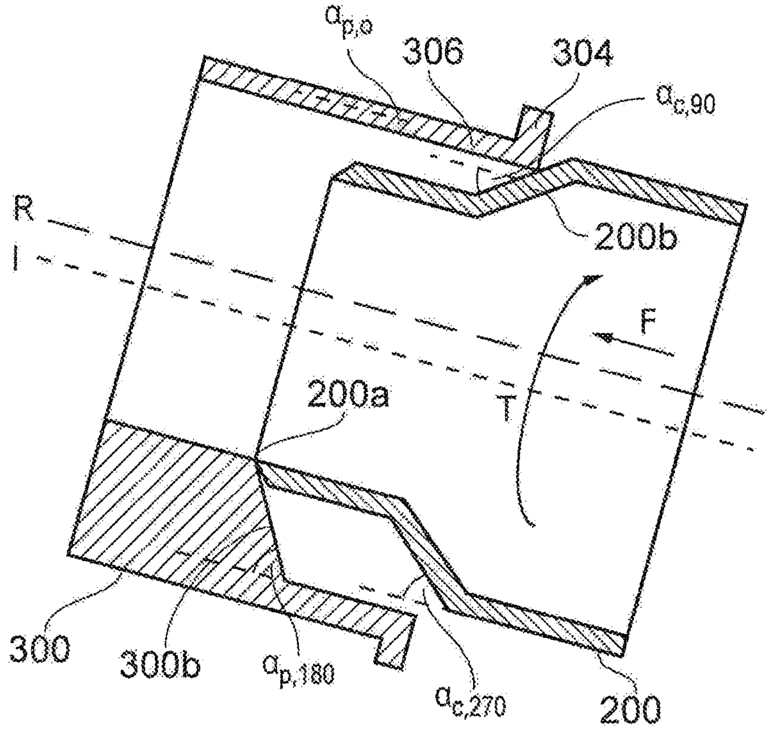
FIG. 8 shows a partial sectional side view of the interaction between a male connector and a female port when rotationally misaligned during a connecting operation.

As shown in FIG. 8*a*, the male connector 200 is initially rotationally and vertically misaligned with the port 300. Although the male connector 200 is rotationally misaligned with the female port 300, as the male connector 200 comprises an external surface with a varying taper angle $\alpha$, the male connector 200 will self-align when inserted into the port 300.

The connector 200 is misaligned by 90° with the port 300 such that the portions of the perimeter wall of the connector 200 at $\beta_c$=90° and $\beta_c$=270° are aligned with the portions of the port 300 at $\beta_p$=0° and $\beta_p$=180°. As both the port 300 and the connector 200 have minimum taper angles of $\alpha_0$ at $\beta$=0°, it will be understood that the taper angle $\alpha_{c,90}$ of the connector at $\beta_c$=90° will be greater than the taper angle $\alpha_{p,0}$ of the port 300 at $\beta_p$=0°, and the taper angle $\alpha_{c,270}$ of the connector at $\beta_c$=270° will be smaller than the taper angle $\alpha_{p,180}$ of the port 300 at $\beta_p$=180°. It is unlikely that the connector 200 would be misaligned by such an extreme angle as 90° during an insertion attempt in use, but the example illustrated indicates the broad range of rotational misalignments which may be corrected by the connector 200.

A force F is applied to insert the connector 200 into the port 300. As the connector 200 is inserted into the port 300 at this 90° misalignment, the distal portion 200*a* of the connector 200 will contact the tapered portion 300*b* of the port 300, and the tapered portion 200*b* of the connector 200 will contact the edge between the peripheral wall 306 and the LDV-engaging portion 304. As a result of the varying taper angle αc around the insertion axis I, and the contact between the tapered portion 200*b* of the connector 200 and the edge between the peripheral wall 306 and the LDV-engaging portion 304, a rotation T of the connector 200 will result in an anticlockwise direction about the insertion axis I.

Figure 8B:
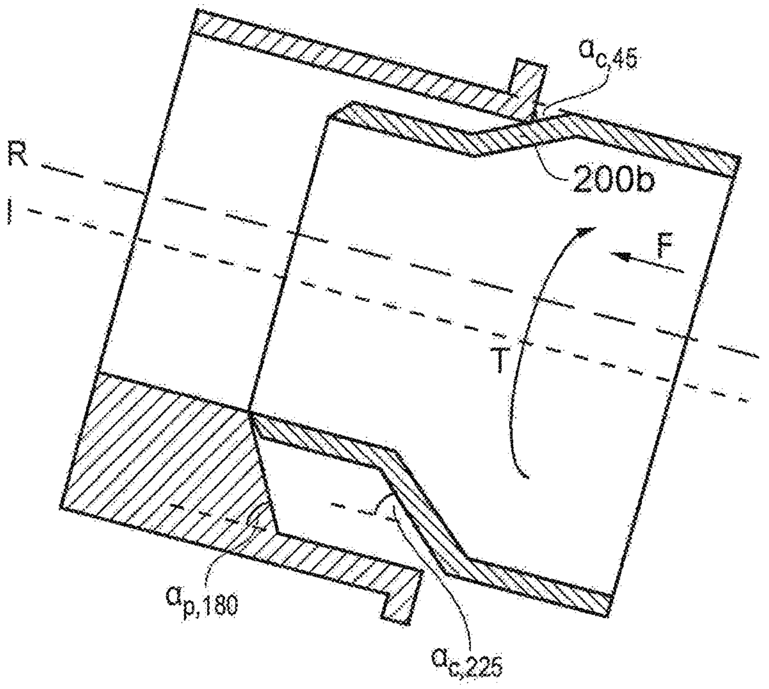

FIG. 8*b* shows the connector 200 and the port 300 after the rotational force T has rotated the connector 200 by 45°. As can be seen, the connector has moved slightly further into the port 300, and the mismatch between the taper angles $\alpha$ of the connector and the port have decreased. The portions of the perimeter wall of the connector 200 at $\beta_c$=45° and $\beta_c$=225° are now aligned with the portions of the port 300 at $\beta_p$=0° and $\beta_p$=180°. It will be understood that the taper angle $\alpha_{c,45}$ of the connector at $\beta_c$=45° will still be greater than the taper angle $\alpha_{p,0}$ of the port 300 at $\beta_p$=0°, and the taper angle $\alpha_{c,225}$ of the connector at $\beta_c$=225° will still be smaller than the taper angle $\alpha_{p,180}$ of the port 300 at $\beta_p$=180°. As a result, the distal portion 200*a* of the connector 200 remains in contact with the tapered portion 300*b* of the port 300, and the tapered portion 200*b* of the connector 200 remains in contact with the edge between the peripheral wall 306 and the LDV-engaging portion 304. Accordingly, the rotational force T will still be applied to the connector 200 which acts to rotate the connector in an anticlockwise direction about the insertion axis I.

The rotation T of the connector 200 will therefore continue on the application of an axial force F to reduce the mismatch between the taper angles $\alpha$ of the connector and the port, until the portions of the perimeter wall of the connector 200 at $\beta_c$=0° and $\beta_c$=0° are aligned with the portions of the port 300 at $\beta_p$=0° and $\beta_p$=180°. At this alignment, the connector 200 can be slidingly received within the port 300 purely in the insertion direction as a result of force F as shown in FIG. 6.

Thus, the configuration of the connection apparatus described herein provides automatic correction of rotational misalignments between the male connector and a female port during an installation operation. The features of the connection apparatus described herein may be generally understood to provide a self-correcting lateral, transverse and/or rotational movement of the male connector with respect to the female port when a force is applied to the male connector towards the female port when misaligned during installation.

The examples of FIGS. 7 and 8 are illustrated in relation to the male connector 200 and corresponding port 300. However, it should be understood that similar advantages can be achieved by connection apparatus comprising alternative examples of male connectors (such as, but not limited to the male connectors 200', 200'' and 200'' described above) and corresponding female ports.

The invention claimed is:

1. A connection apparatus for connecting breathing gas delivery components of a breathing apparatus, comprising:

a male connector configured to be received in a corresponding female port, the male connector comprising a perimeter wall defining an external shape of the male connector and enclosing a gas conduit;

wherein the perimeter wall comprises a prismatic distal portion arranged about a distal axis and defining a first cross-sectional area of the male connector, a prismatic proximal portion arranged about a proximal axis and defining a second cross-sectional area of the male connector larger than the first cross-sectional area, and a tapered portion formed between the prismatic proximal portion and the prismatic distal portion;

wherein the distal axis is parallel and offset from the proximal axis; and wherein the female port comprises a peripheral wall defining a cavity for receiving the male connector, the peripheral wall of the female port comprising prismatic proximal, tapered, and prismatic distal portions correspondingly shaped to follow respective contours of the male connector prismatic proximal, tapered, and prismatic distal portions; such that, during connection of the male connector and the female port, any rotational or transverse misalignment of the male connector and female port is automatically corrected.

2. The connection apparatus according to claim 1, wherein the male connector defines an insertion axis along which the male connector is receivable into a corresponding female port.

3. The connection apparatus according to claim 2, wherein the tapered portion of the perimeter wall forms a taper angle with the insertion axis.

4. The connection apparatus according to claim 3, wherein the taper angle is varied with the angular position around the insertion axis.

5. The connection apparatus according to claim 1, wherein the connection apparatus is configured such that, when the prismatic distal portion of the male connector is in contact with the tapered portion of the peripheral wall of the female port, the application of force on the male connector towards the female port results in a lateral and/or rotational movement of the male connector with respect to the female port.

6. The connection apparatus as claimed in claim 5, wherein the male connector is provided on a breathing gas supply component and the female port is provided on a breathing face mask, or wherein the male connector is provided on a breathing face mask and the female port is provided on a breathing gas supply component.

7. The connection apparatus as claimed in claim 6, wherein the breathing gas supply component is a lung demand valve or a closed-circuit breathing apparatus (CCBA) connector for supplying breathing gas from a CCBA to the breathing face mask.

8. The connection apparatus according to claim 1 wherein the tapered portion of the male connector is frustoconical.

9. The connection apparatus according to claim 1, wherein the tapered portion of the male connector is obliquely frustoconical.

10. A breathing apparatus comprising:
- a source of breathing gas configured to be supported by a user,
- a first breathing gas delivery component including a breathing face mask configured to be worn by the user,
- a second breathing gas delivery component including a breathing gas supply configured to deliver breathing gas from the source of breathing gas to the breathing face mask, and
- the connection apparatus according to claim 1 for connecting the first breathing gas delivery component and the second breathing gas delivery component.

11. A connection apparatus for connecting breathing gas delivery components of a breathing apparatus, comprising:
- a male connector configured to be received in a corresponding female port, the male connector comprising a perimeter wall defining an external shape of the male connector and enclosing a gas conduit;
- wherein the perimeter wall comprises a tubular distal portion arranged about a distal axis and defining a first cross-sectional area of the male connector, a tubular proximal portion arranged about a proximal axis and defining a second cross-sectional area of the male connector larger than the first cross-sectional area, and a tapered portion formed between the tubular proximal portion and the tubular distal portion;
- wherein the distal axis is parallel and offset from the proximal axis; and
- wherein the female port comprises a peripheral wall defining a cavity for receiving the male connector, the peripheral wall of the female port comprising tubular proximal, tapered, and tubular distal portions correspondingly shaped to follow respective contours of the male connector tubular proximal, tapered, and tubular distal portions; such that, during connection of the male connector and the female port, any rotational or transverse misalignment of the male connector and female port is automatically corrected.

12. The connection apparatus according to claim 11 wherein the first cross-sectional area and the second cross-sectional area are circular areas.

13. The connection apparatus according to claim 12, wherein the circular areas of the first cross-sectional area and the second cross-sectional area are internally tangential.

14. A breathing apparatus comprising:
- a source of breathing gas configured to be supported by a user,
- a first breathing gas delivery component including a breathing face mask configured to be worn by the user,
- a second breathing gas delivery component including a breathing gas supply configured to deliver breathing gas from the source of breathing gas to the breathing face mask, and
- the connection apparatus according to claim 11 for connecting the first breathing gas delivery component and the second breathing gas delivery component.

15. A connection apparatus for connecting breathing gas delivery components of a breathing apparatus, comprising:
- a male connector configured to be received in a corresponding female port, the male connector comprising a perimeter wall defining an external shape of the male connector and enclosing a gas conduit;
- wherein the perimeter wall comprises a cylindrical distal portion arranged about a distal axis and defining a first cross-sectional area of the male connector, a cylindrical proximal portion arranged about a proximal axis and defining a second cross-sectional area of the male connector larger than the first cross-sectional area, and a tapered portion formed between the cylindrical proximal portion and the cylindrical distal portion;
- wherein the distal axis is parallel and offset from the proximal axis; and
- wherein the female port comprises a peripheral wall defining a cavity for receiving the male connector, the peripheral wall of the female port comprising cylindrical proximal, tapered, and cylindrical distal portions correspondingly shaped to follow respective contours of the male connector cylindrical proximal, tapered, and cylindrical distal portions; such that, during connection of the male connector and the female port, any rotational or transverse misalignment of the male connector and female port is automatically corrected.

16. The connection apparatus according to claim 15, wherein the first cross-sectional area and the second cross-sectional area are internally tangential.

17. A breathing apparatus comprising:
- a source of breathing gas configured to be supported by a user,
- a first breathing gas delivery component including a breathing face mask configured to be worn by the user,
- a second breathing gas delivery component including a breathing gas supply configured to deliver breathing gas from the source of breathing gas to the breathing face mask, and
- the connection apparatus according to claim 15 for connecting the first breathing gas delivery component and the second breathing gas delivery component.

* * * * *